United States Patent

[11] 3,594,616

[72] Inventors Tsuneharu Nitta
 Osaka;
 Hiromitsu Taki, Osaka; Kaneomi Nagase, Kyoto; Shigeru Hayakawa, Osaka, all of, Japan
[21] Appl. No. 830,607
[22] Filed June 5, 1969
[45] Patented July 20, 1971
[73] Assignee Matsushita Electric Industrial Co., Ltd.
 Kadoma, Japan
[32] Priority June 19, 1968, June 20, 1968, Sept. 25, 1968, Oct. 8, 1968
[33] Japan
[31] 43/43044, 43/43207, 43/70654 and 43/74056

[54] CERAMIC CAPACITOR COMPRISING SEMICONDUCTIVE BARIUM TITANATE BODY AND SILVER ALLOY ELECTRODES CONTAINING MINOR AMOUNTS OF LEAD OXIDE AND BISMUTH OXIDE
12 Claims, 1 Drawing Fig.

[52] U.S. Cl. .................................................. 317/230,
 317/238, 317/233, 29/569
[51] Int. Cl. ...................................................... H01g 9/04,
 H01l 3/08
[50] Field of Search ............................................. 317/230,
 231, 233, 238

[56] References Cited
UNITED STATES PATENTS
| 3,351,500 | 11/1967 | Khauri.......................... | 317/230 X |
| 3,419,758 | 12/1968 | Hayakawa et al............. | 317/230 |
| 3,419,759 | 12/1968 | Hayakawa..................... | 317/230 |
| 3,529,218 | 9/1970 | Nitta et al...................... | 317/230 |

Primary Examiner—James D. Kallam
Attorney—Wenderoth, Lind and Ponack

ABSTRACT: A ceramic voltage dependent resistor made up of a semiconductive titanate (e.g. barium titanate) plate having a nonohmic electrode on one surface thereof and an ohmic electrode on the other surface. The nonohmic electrode consists essentially of 93—55 percent by weight of silver component, 6.5—25 percent by weight of lead oxide and bismuth oxide and 0.5—38.5 percent by weight of at least one metal oxide selected from the group consisting of boron, copper, cadmium, zinc, nickel, cobalt, iron, titanium, niobium and tantalum. The thickness of the nonohmic electrode after firing it onto the titanate plate is 40—250 microns. The titanate plate comprises barium titanate of a means grain size of 5 to 50 microns and has an electrical resistivity less than 10 ohm-cm. Such voltage dependent resistors are suitable for use in varistors.

PATENTED JUL 20 1971  3,594,616
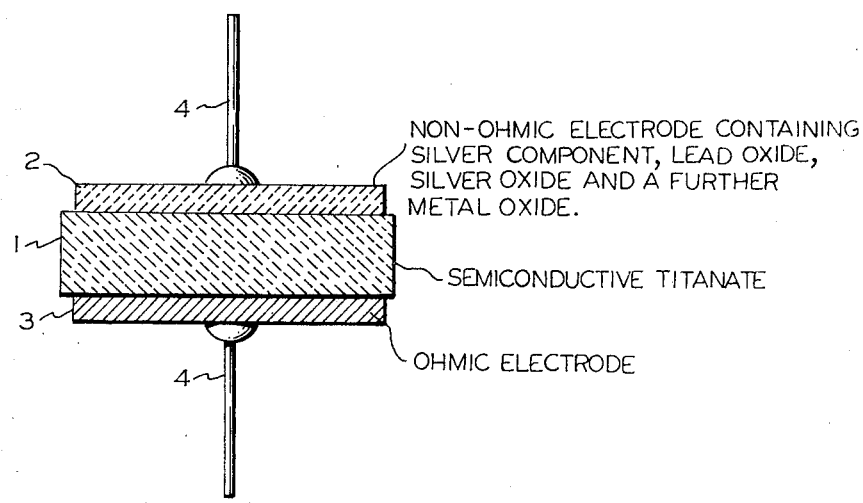
INVENTORS
TSUNEHARU NITTA
HIROMITSU TAKI
KANEOMI NAGASE
SHIGERU HAYAKAWA
BY *Wenderoth, Lind & Ponack*
ATTORNEYS

CERAMIC CAPACITOR COMPRISING SEMICONDUCTIVE BARIUM TITANATE BODY AND SILVER ALLOY ELECTRODES CONTAINING MINOR AMOUNTS OF LEAD OXIDE AND BISMUTH OXIDE

This invention relates to a voltage dependent resistor comprising semiconductive titanate ceramic and conducting electrodes applied to surfaces of said ceramic and more particularly to a voltage dependent resistor having a current-voltage characteristic which is asymmetrical with respect to the polarity of the applied voltage, and relates also to a method of fabrication thereof.

There are now a number of different types of voltage dependent resistors. The asymmetrical current-voltage characteristic is closely related to a potential barrier formed at the point of contact between two materials having different work functions.

A voltage dependent resistor, therefore, is constructed as follows: one surface of a semiconductor is contacted by an electrode and a potential barrier is formed therebetween and the other surface is contacted by an ohmic electrode. In the asymmetric characteristic, the forward current (I) can be expressed as a function of applied voltage (V) as follows:

$$I = I_o e^{V/\beta} \quad (1)$$

where $I_o$ and $\beta$ are constants depending on the potential barrier. $\beta$ is the reciprocal of the slope of the log I–V curve and can be written as follows:

$$\beta = \frac{V_1 - V_2}{2.303 \log(I_1/I_2)}$$

The term $\beta$ indicates the rate of variation of voltage with the logarithmic change in current. Therefore, $\beta$ is a characteristic constant of the voltage dependent resistor when the voltage dependent resistor is used as a voltage-stabilizing device, such as a conventional Si-varistor. Another characteristic constant is a voltage for a given current that ranges in the linear portion of the log I–V curves. This voltage is tentatively termed the varistor voltage.

An asymmetrical varistor requires a small $\beta$, various varistor voltages over a wide range from a high voltage to a low, a reduced leakage current, a high stability with respect to humidity, time, temperature and electric load and a low cost.

Although many efforts have been directed to the concurrent improvement of all these characteristics, entirely satisfactory results have not been obtained with the conventional voltage dependent resistor such as a Si-varistor.

It has been well known that barium titanate has a relatively low electrical resistance at room temperature (20° C. to 30° C.) when the barium titanate has incorporated therein a small amount of rare earth oxide such as cerium oxide, samarium oxide, and/or yttrium oxide or has been fired in an atmosphere containing a small amount of oxygen. The ceramics are N-type semiconductors in which current carriers are electrons.

When silver paste is fired on the surface of the ceramic to form an electrode, a potential barrier is formed at the interface between the electrode and the ceramic. Therefore, a voltage dependent resistor can be constructed when the other surface is contacted by an ohmic electrode such as an indium-gallium alloy. However, it is very difficult to obtain the required asymmetric varistor properties. The properties are attributed to the rectifying action of the potential barrier layer formed at the interface between the ceramic material and the metal electrode. The basic concept of the potential barrier layer is exemplified by U.S. Pat. No. 3,419,759 entitled "Capacitor Comprising Ferroelectric Ceramic with Oxidic Silver Electrodes and Heterojunction Barrier Layer between Electrodes and Ceramic," and U.S. Pat. No. 3,419,758 entitled "Ceramic Capacitor Comprising Semiconductive Barium Titanate Body and Silver Alloy Electrodes containing Minor Amount of Cu, Cd or Bi."

It is an object of the present invention to provide a novel voltage dependent resistor comprising semiconductive titanate ceramic and electrodes and having a high nonlinearity characterized by a small value of $\beta$.

It is another object of the present invention to provide a novel voltage dependent resistor characterized by various varistor voltages, reduced leakage current, high stability with respect to humidity, time, temperature and electric load and a low cost.

It is a further object of the present invention to provide a method for making a voltage dependent resistor characterized by a small value of $\beta$, various varistor voltages, reduced leakage current, and high stability with respect to humidity, time, temperature and electric load.

Such voltage dependent resistors are suitable for use in varistors.

These objects are achieved by a ceramic voltage dependent resistor which comprises a semiconductive titanate plate having a nonohmic electrode applied to one surface thereof and an ohmic electrode applied to another surface thereof, said nonohmic electrode consists essentially of, as solid ingredients, 93—55 percent by weight of a silver component, 6.5—25 percent by weight of a combined addition of lead oxide and bismuth oxide and 0.5—38.5 percent by weight of a further addition of at least one metal oxide selected from the group consisting of boron, copper, cadmium, zinc, cobalt, iron, titanium, niobium and tantalum. These and other features of the present invention will become apparent upon consideration of the following description taken together with the accompanying drawing in which the FIGURE is a sectional view of a preferred embodiment of the present invention.

Proceeding with the detailed description of the present invention, the construction of a ceramic voltage dependent resistor contemplated by the present invention will be explained with reference to the FIGURE which shows a ceramic voltage dependent resistor according to the present invention.

A semiconductive titanate plate 1 has a nonohmic electrode 2 applied to one surface thereof and an ohmic electrode 3 applied to another surface thereof. Said electrode 2 and 3 are electrically connected to lead wire 4 by any suitable and available method such as soldering. The nonohmic electrode consists essentially of, as solid ingredients, 93—55 percent by weight of a silver component, 6.5—25 percent by weight of a combined addition of lead oxide and bismuth oxide and 0.5—38.5 percent by weight of a further addition of at least one metal oxide selected from the group consisting of boron, copper, cadmium, zinc, nickel, cobalt, iron, titanium, niobium and tantalum.

It is important for achievement of a voltage dependent resistor characterized by a high stability with time, temperature, humidity and electric load that said nonohmic electrode applied to one surface be fired at 600° C. to 920° C. in an oxidizing atmosphere containing 2 to 100 percent by volume of oxygen. In connection with the leakage current and the $\beta$-value, a preferred composition of said nonohmic electrode consists essentially of, as solid ingredients, 80—60 percent by weight of a silver component, 14—24 percent by weight of a combined addition of lead oxide and bismuth oxide and 6—26 percent by weight of a further addition of at least one metal oxide selected from the group consisting of boron, copper, cadmium, zinc, nickel, cobalt, iron, titanium, niobium and tantalum.

Said combined addition preferably consists of 40—60 percent by weight of lead oxide and 60—40 percent by weight of bismuth oxide.

Said silver component can be made of pure silver at preferably of a combination of 10—80 percent by weight of silver and 20—90 percent by weight of silver oxide. It has been discovered according to the present invention that said silver component should be made of a finely divided powder having a particle size less than 1.5 microns.

A load life test of the resultant voltage dependent resistor is greatly improved by giving said nonohmic electrode a thickness of 40—250 microns in accordance with the present invention.

Among various further additions, the use of boron oxide, a combination of cadmium oxide and copper oxide or a combination of cadmium oxide, copper oxide and niobium oxide results in a higher stability during the load life test. Said combination of cadmium oxide and copper oxide consists essentially of 20—80 percent by weight of cadmium oxide and 80—20 percent by weight of copper oxide and and said combination of cadmium oxide, copper oxide and niobium oxide consists essentially of 20—50 percent by weight of cadmium oxide, 20—40 percent by weight of copper oxide and 10—60 percent by weight of niobium oxide.

Said semiconductive titanate plate can be formed by using a semiconductive titanate having an electrical resistivity less than 10 ohm-cm, such as barium titanate or strontium titanate.

It has been discovered according to the present invention that said semiconductive titanate plate having a mean grain size of 5 to 50 microns produces a voltage dependent resistor characterized by a high stability during a load life test.

The semiconductive titanate 1, for example, barium titanate can be prepared by mixing barium carbonate and titanium dioxide in an equimolecular ratio with the addition of a small amount of titanium dioxide, pressing the mixture into the form of a disc, and sintering at 1380° C. to 1400° C. in a nonoxidizing atmosphere. The mixture can be doped with aluminum oxide, silicon dioxide and silver oxide and, when desired, can be calcined at 1000° C. to 1150° C. prior to sintering.

The electrode composition in a powder form is mixed with conventional organic binder such as polyester to form a pigment. The thus-prepared pigments are painted on one surface of the semiconductive titanate ceramic and fired at 600° C to 920° C in an oxidizing atmosphere containing 2 to 100 percent by volume of oxygen. Cooling to room temperature (20° C to 30° C) is then carried out in said firing atmosphere.

According to the present invention, the firing-on atmosphere has a very pronounced effect on the varistor action of the ceramic voltage dependent resistor. For example, a firing atmosphere having a low oxygen content, such as a nitrogen atmosphere, inhibits the varistor action. While air is the preferred oxidizing atmosphere, use may be made of an atmosphere which contains from 2 to 100 percent by volume of available oxygen, e.g. a nitrogen-oxygen mixture. Good varistor action is obtained when the electrode pigment is fired at a temperature ranging from 600° C to 920° C.

The ohmic electrode 3 can be formed of any suitable metal such as aluminum, zinc or copper which is prepared by any suitable method, for example, vacuum deposition, spray metallizing and electroplating. Aluminum metal among these metals results in the best ohmic electrode.

The following Examples of presently preferred embodiments are given by way of illustration and should not be construed as limitative. Percentages are by weight.

EXAMPLES 1—27

Semiconductive titanate is made in a per se conventional manner. Semiconductive barium titanate is prepared by the following method: an equimolecular mixture of titanium dioxide and barium carbonate is wet and admixed with 1.6 wt. percent of silver oxide, 0.22 wt. percent of aluminum oxide, 0.37 wt. percent of silicon oxide and 0.3 wt. percent of titanium oxide, pressed into discs 8 mm in diameter and 1 mm thick, and sintered at 1380° C for 2 hours in a nitrogen atmosphere. The sintered body is black in color and has 1.0—0.3 ohm-cm. electrical resistivity. The grain size is 16 to 45 microns in diameter. These sintered discs are then provided, on one surface, with a nonohmic electrode and on another surface, with an ohmic electrode as explained hereinafter. Electrode compositions containing silver, silver oxide, a combined addition of lead oxide and bismuth oxide and a further addition of at least one metal oxide selected from the group consisting of, boron, copper, cadmium, zinc, nickel, cobalt, iron, titanium, niobium and tantalum and as shown in Table I, are prepared by using mixed powder, the particles of which are 0.05 to 1.5 microns in diameter. The pigment compositions are mixed with a conventional organic binder such as polyester to form a pigment. The pigment is painted on one surface of the semiconductive titanate ceramic, fired at 820° C in air for 10 minutes and cooled to room temperature (20° C to 30° C). The thickness of the electrode is 35 to 260 microns. The thus-prepared discs are subsequently provided with an ohmic electrode on another surface thereof. The ohmic electrode is prepared by evaporating aluminum metal. In order to facilitate soldering a lead wire thereto, the aluminum ohmic electrode is coated with copper metal by evaporation. Electrical properties are measured by a per se well-known method.

The present ceramic voltage dependent resistor has a linear portion of log I—V curves when the current is more than a few milliamperes. For example, the varistor voltage is determined as voltage for the forward current of 1.5 mA, and is expressed by $V_{1.5mA}$. The $\beta$ value is computed from $V_{1.5mA}$ and $V_{15mA}$.

Leakage current in the reverse direction is measured by applying a field of 8V (DC).

The temperature coefficient of the varistor voltage in the forward direction is obtained by measuring $V_{1.5mA}$ over a range of temperature of −55° C to +85° C.

A load life test is done in a thermostat at 60° C and more than 95 percent (relative humidity) by applying a current of 10 milliamperes for 2000 hours and the variation in the value of $V_{1.5mA}$ is expressed by percentages.

Electrical properties of the present ceramic voltage dependent resistor are shown in Table II. The pigment containing boron oxide has a high varistor voltage. The pigments containing niobium oxide or tantalum oxide tend to result in a low varistor voltage. A combined addition of lead oxide and bismuth oxide and a further addition of the other metal oxide results in a higher stability with respect to time, temperature, humidity and electric load than a combined addition of only lead oxide and bismuth oxide.

The present ceramic voltage dependent resistor has a small $\beta$ and a small temperature coefficient.

The present ceramic voltage dependent resistor is suited for use in transistorized bias circuits to stabilize voltage.

TABLE I

| Sample No. | Silver component in weight percent | | Silver component | Weight percent of solid ingredients of electrode pigment | | | | | | | | | | | |
|---|---|---|---|---|---|---|---|---|---|---|---|---|---|---|---|
| | Ag | Ag$_2$O | | Pb$_3$O$_4$ | Bi$_2$O$_3$ | B$_2$O$_3$ | Cu$_2$O | CdO | ZnO | NiO | CoO | Fe$_2$O$_3$ | TiO$_2$ | Nb$_2$O$_5$ | Ta$_2$O$_5$ |
| 1 | 100 | | 80 | 10 | 10 | | | | | | | | | | |
| 2 | 0 | 100 | 80 | 10 | 10 | | | | | | | | | | |
| 3 | 50 | 50 | 80 | 10 | 10 | | | | | | | | | | |
| 4 | 50 | 50 | 75 | 10 | 10 | 5 | | | | | | | | | |
| 5 | 50 | 50 | 75 | 10 | 10 | | 5 | | | | | | | | |
| 6 | 50 | 50 | 75 | 10 | 10 | | | 5 | | | | | | | |
| 7 | 50 | 50 | 75 | 10 | 10 | | | | 5 | | | | | | |
| 8 | 50 | 50 | 75 | 10 | 10 | | | | | 5 | | | | | |
| 9 | 50 | 50 | 75 | 10 | 10 | | | | | | 5 | | | | |
| 10 | 50 | 50 | 75 | 10 | 10 | | | | | | | 5 | | | |
| 11 | 50 | 50 | 75 | 10 | 10 | | | | | | | | 5 | | |
| 12 | 50 | 50 | 75 | 10 | 10 | | | | | | | | | 5 | |
| 13 | 50 | 50 | 75 | 10 | 10 | | | | | | | | | | 5 |
| 14 | 50 | 50 | 71 | 13 | 10 | | 3 | 3 | | | | | | | |

Table I—Continued

| Sample No. | Silver component in weight percent | | Weight percent of solid ingredients of electrode pigment | | | | | | | | | | | | |
|---|---|---|---|---|---|---|---|---|---|---|---|---|---|---|---|
| | Ag | Ag₂O | Silver component | Pb₃O₄ | Bi₂O₃ | B₂O₃ | Cu₂O | CdO | ZnO | NiO | CoO | Fe₂O₃ | TiO₂ | Nb₂O₅ | Ta₂O₅ |
| 15 | 50 | 50 | 70 | 10.5 | 10.5 | | 3 | 3 | | | | | | 3 | |
| 16 | 50 | 50 | 70 | 10.5 | 10.5 | | 3 | 3 | 3 | | | | | | |
| 17 | 50 | 50 | 70 | 10.5 | 10.5 | | 3 | | | 3 | | | 3 | | |
| 18 | 50 | 50 | 70 | 12 | 12 | | 3 | | | | | | | | 3 |
| 19 | 50 | 50 | 70 | 12.5 | 10 | 2.5 | 2.5 | 2.5 | | | | | | | |
| 20 | 50 | 50 | 68 | 11 | 11 | | 2 | | 3 | | | | | | |
| 21 | 50 | 50 | 70 | 11 | 11 | 5 | | | 3 | | | | | | |
| 22¹ | 50 | 50 | 93 | 2 | 2 | | 1 | 1 | | | | | | 1 | |
| 23¹ | 50 | 50 | 55 | 12 | 12 | | 7 | 7 | | | | | | 7 | |
| 24¹ | 50 | 50 | 68 | 11 | 11 | | 2 | 3 | | | | | | 7 | |
| 25¹ | 50 | 50 | 68 | 11 | 11 | | 2 | 3 | | | | | | 5 | |
| 26¹ | 50 | 50 | 68 | 7.2 | 16.8 | | 7 | 7 | | | | | | | |
| 27¹ | 50 | 50 | 68 | 16.8 | 7.2 | | 7 | 7 | | | | | | | |

¹ These samples are illustrations to indicate the poorer properties of ceramic voltage dependent varistors which are outside the scope of the present invention.

TABLE II

| Sample No. | Thickness of non-ohmic electrode (micron) | Electrical properties | | | | | Reverse direction |
|---|---|---|---|---|---|---|---|
| | | Forward direction | | | | | Leakage current at 8 V. (D.C.) (a.) |
| | | $V_{1.5\,ma}$ | $V_{15\,ma}$ | Temperature coefficient of $V_{1.5\,ma}$ (−55° C. to β +85° C.) $_{1.5\,ma}$ | Varied value of $V_{1.5\,ma}$ after applying a current of 10 ma. for 2,000 hrs. at 60° C. and 95% RH (percent) | | |
| 1¹ | 90 | 1.83 | 2.29 | 0.20 | −4.6 | −21.3 | 49 |
| 2¹ | 90 | 1.89 | 2.37 | 0.21 | −5.2 | −21.3 | 52 |
| 3 | 90 | 1.86 | 2.31 | 0.16 | −3.7 | −15.1 | 27 |
| 4 | 90 | 3.20 | 3.86 | 0.26 | −0.8 | −0.20 | 0.04 |
| 5 | 90 | 1.47 | 1.59 | 0.05 | −0.7 | −1.20 | 0.06 |
| 6 | 90 | 1.35 | 1.52 | 0.073 | −0.5 | −1.19 | 0.12 |
| 7 | 90 | 1.49 | 1.68 | 0.085 | −1.1 | −1.7 | 0.18 |
| 8 | 90 | 1.54 | 1.69 | 0.063 | −1.0 | −1.6 | 0.09 |
| 9 | 90 | 1.20 | 1.39 | 0.083 | −1.2 | −1.7 | 0.17 |
| 10 | 90 | 1.31 | 1.51 | 0.087 | −1.8 | −2.3 | 0.23 |
| 11 | 90 | 1.28 | 1.47 | 0.083 | −1.7 | −1.5 | 0.45 |
| 12 | 90 | 0.78 | 0.9 | 0.052 | −0.1 | −0.9 | 2.4 |
| 13 | 90 | 0.91 | 1.1 | 0.083 | −0.16 | −0.95 | 2.3 |
| 14 | 90 | 1.54 | 1.69 | 0.063 | −0.07 | −0.2 | 0.09 |
| 15 | 90 | 1.20 | 1.31 | 0.048 | −0.06 | −0.1 | 0.14 |
| 16 | 90 | 1.47 | 1.59 | 0.052 | −1.0 | −1.1 | 0.12 |
| 17 | 90 | 1.29 | 1.42 | 0.055 | −1.7 | −1.8 | 0.10 |
| 18 | 90 | 1.10 | 1.33 | 0.10 | −1.3 | −1.6 | 0.15 |
| 19 | 90 | 2.0 | 2.28 | 0.12 | −1.1 | −1.2 | 0.06 |
| 20 | 90 | 1.15 | 1.38 | 0.10 | −0.4 | −1.8 | 2.6 |
| 21 | 90 | 3.00 | 3.56 | 0.24 | −0.1 | −0.28 | 0.09 |
| 22¹ | 90 | 1.00 | 1.60 | 0.26 | −1.5 | −1.7 | 48 |
| 23¹ | 90 | 1.48 | 2.22 | 0.32 | −2.3 | −3.5 | 36 |
| 24¹ | 35 | 1.16 | 1.38 | 0.10 | −1.9 | −6.2 | 3.7 |
| 25¹ | 260 | 1.14 | 13.6 | 0.10 | −2.1 | −5.3 | 4.2 |
| 26¹ | 90 | 1.23 | 1.97 | 0.32 | −1.7 | −1.6 | 16 |
| 27¹ | 90 | 1.29 | 1.98 | 0.30 | −2.5 | −1.4 | 21 |

¹ These samples are illustrations to indicate the poorer properties of ceramic voltage dependent varistors which are outside the scope of the present invention.

What we claim is:

1. A ceramic voltage dependent resistor comprising a semiconductive titanate plate having a nonohmic electrode on one surface thereof and an ohmic electrode on the other surface thereof, said nonohmic electrode consisting essentially of, as solid ingredients, 93—55 percent by weight of silver component, 6.5—25 percent by weight of a combined addition of lead oxide and bismuth oxide and 0.5—38.5 by weight of a further addition of at least one metal oxide selected from the group consisting of boron, copper, cadmium, zinc, nickel, cobalt, iron, titanium, niobium and tantalum.

2. A ceramic voltage dependent resistor according to claim 1, wherein said nonohmic electrode consists essentially of, as solid ingredients, 80—60 percent weight of silver component, 14—24 percent by weight of a combined addition of lead oxide and bismuth oxide and 6—26 percent by weight of a further addition of at least one metal oxide from the group consisting of boron, copper, cadmium, zinc, nickel, cobalt, iron, titanium, niobium and tantalum.

3. A ceramic voltage dependent resistor according to claim 2, wherein said silver component consists essentially of 10—80 percent by weight of silver and 20—90 percent by weight of silver oxide.

4. A ceramic voltage dependent resistor according to claim 2, wherein said further addition consists essentially of boron oxide.

5. A ceramic voltage dependent resistor according to claim 2, wherein said further addition consists essentially of 20—80 percent by weight of cadmium oxide and 80—20 percent by weight of copper oxide.

6. A ceramic voltage dependent resistor according to claim 2, wherein said further addition consists essentially of 20—50 percent by weight of cadmium oxide, 20—40 percent by weight of copper oxide and 10—60 percent by weight of niobium oxide.

7. A ceramic voltage dependent resistor according to claim 2, wherein said ohmic electrode comprises aluminum.

8. A ceramic voltage dependent resistor according to claim 3, wherein said semiconductive titanate plate is comprised of titanate having a mean grain size of 5 to 50 microns and an electrical resistivity less than 10 ohm-cm.

9. A ceramic voltage dependent resistor according to claim 2, wherein said combined addition consists essentially of 40 — 60 percent by weight of lead oxide and 60—40 percent by weight of bismuth oxide.

10. A ceramic voltage dependent resistor according to claim 9, wherein said semiconductive titanate plate consists essentially of barium titanate.

11. A ceramic voltage dependent resistor according to claim 2, wherein the said nonohmic electrode has a thickness of from 40 to 250 microns.

12. A method of making a ceramic voltage dependent resistor comprising providing a semiconductive titanate ceramic body; applying to one surface of said ceramic body, an electrode pigment consisting essentially of, as solid ingredients, 93—55 percent by weight of silver component, 6.5—25 percent by weight of a combined addition of lead oxide and bismuth oxide and 0.5—38.5 percent by weight of a further addition of at least one metal oxide selected from the group consisting of boron, copper, cadmium, zinc, nickel, cobalt, iron, titanium, niobium and tantalum; firing said electrode pigment at 600° C to 920° C in an oxidizing atmosphere having an oxygen content ranging from 2 to 100 percent by volume; cooling said fired body having said electrode pigment thereon to room temperature in said oxidizing atmosphere; and applying to another surface of said ceramic body an aluminum electrode.